United States Patent

Smith

[15] 3,642,088
[45] Feb. 15, 1972

[54] SELF-LOCATING VERTICALLY AND FACINGLY ADJUSTABLE SEAT

[72] Inventor: Wayne G. Smith, Burlington, Iowa
[73] Assignee: J. I. Case Company, Racine, Wis.
[22] Filed: Feb. 2, 1970
[21] Appl. No.: 7,578

[52] U.S. Cl. ............................180/77 S, 248/408, 248/423, 296/65, 297/345
[51] Int. Cl. .......................................B60n 1/02, A61g 15/00
[58] Field of Search ...................180/77 S; 296/65; 297/349, 297/345; 248/408, 161, 423, 425

[56] References Cited

UNITED STATES PATENTS

| | | | |
|---|---|---|---|
| 2,909,212 | 10/1959 | Scherer | 297/345 X |
| 2,946,373 | 7/1960 | McCanse et al. | 297/345 X |
| 3,223,193 | 12/1965 | Reynolds et al. | 180/77 S |
| 3,437,373 | 4/1969 | Boston | 296/65 |
| 3,448,820 | 6/1969 | Aiello et al. | 180/77 S |

FOREIGN PATENTS OR APPLICATIONS 993,019  5/1965  Great Britain ........................180/77 S

*Primary Examiner*—A. Harry Levy
*Attorney*—Arthur J. Hansmann

[57] ABSTRACT

A tractor having a forwardly located control and a rearwardly located control and a seat mounted between the two controls. The seat has a seating support and a post which is telescoped within a sleeve affixed to the tractor. The post and seating support can be both raised and rotated, relative to the sleeve and the remainder of the tractor, for vertically adjusting the seat and for facing the seat toward the forward control or toward the rearward control. The post has pinholes and grooves, and the sleeve has a pin which can be received in any one of the holes for the elevating or turning of the seat in the selected position, as mentioned. The two controls are offset in the lateral direction of the tractor, and the seat is located and arranged to have its seating support offset relative to the post so that upon turning or rotating the seating support, the seating support is positioned in line with the selected one of the two controls.

5 Claims, 4 Drawing Figures

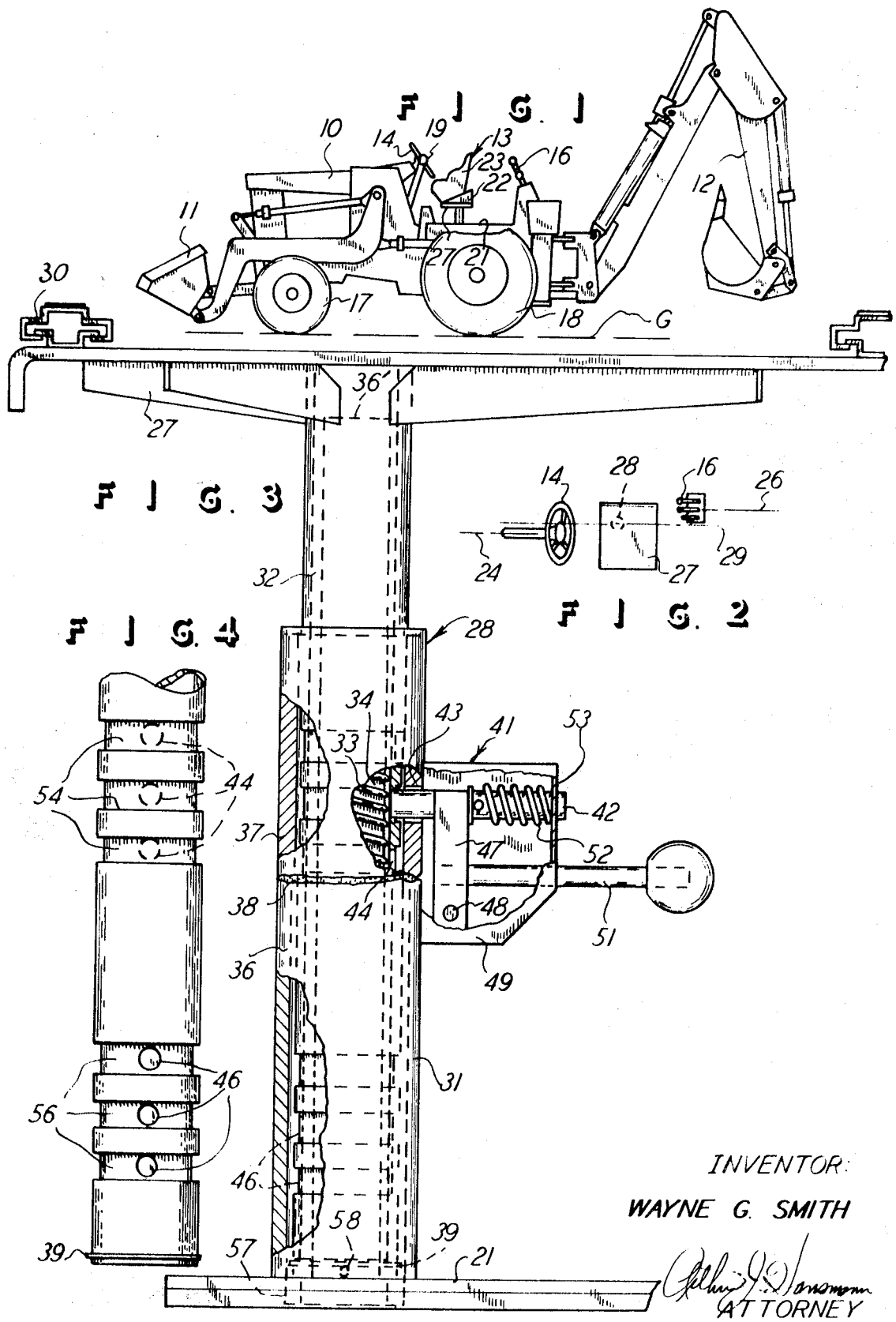

SELF-LOCATING VERTICALLY AND FACINGLY ADJUSTABLE SEAT

This invention relates to a self-locating vertically and facingly adjustable seat, and it has particular application in a tractor having a forwardly located control and a rearwardly located control. The seat is arranged for supporting the operator so that he can have easy access to either of the two controls, and this is accomplished by having the seat vertically adjustable and rotationally adjustable.

BACKGROUND OF THE INVENTION

Tractors having forwardly located and rearwardly located controls, and having an adjustable seat between the controls, are well known in the art. For instance, U.S. Pat. No. 3,437,373 shows an arrangement of a vertically and rotationally adjustable seat on a tractor having these dual controls, with one of the controls for steering the tractor or for operating the forwardly located implement, and the other of the controls being shown as a means for controlling a backhoe mounted on the tractor. The cited patent also shows that is it old to have the tractor seat vertically adjustable and to also have it rotatable so that it can face either the forward or the rearward direction. With this arrangement, the operator can be best positioned relative to either of the two controls. Also, the prior art is already aware of adjustable tractor seats which have spring means or the like for assisting in raising the seat to adjust it upwardly, and it is old to have the seat pedestal arranged so that the seat is sturdy and can be adjusted to various but certain set positions.

However, the adjustable seats of the prior art do not fully answer the requirements for readily and easily adjusting the seat to the desired selected positions. That is, the prior art structures require that the operator maneuver the seat in specific motions in order to latch or secure the seat in the desired or selected position. Such maneuvering is required in order to find both the desired elevation for the seat and to find the proper facing direction of the seat. Thus, while U.S. Pat. No. 3,437,373 shows an improved construction for the adjustable mounting of a seat, it does not show any means for arriving at the desired adjusting positions.

It is a general object of this invention to solve the aforementioned problems relating to the prior art. More specifically, it is an object of this invention to provide an adjustable seat which has self-locating means for placing the seat in the desired elevated position and also for placing it in the desired facing or rotated position. In accomplishing this object, the self-locating means is provided in a reliable but inexpensive structure, and one which does not require any elaborate mechanism nor does it in any way weaken the seat structure.

Another object of this invention is to provide a vertically and rotationally adjustable seat for a tractor having a forwardly located control and a rearwardly located control wherein the two controls are laterally offset relative to the tractor but wherein the adjustable seat has means for accommodating the lateral offset of these controls. Here also the object is accomplished by a structure which is reliable but inexpensive and one which permits the operator to immediately find the desired adjusted position for the seat, regardless of which of the two controls the operator desires to sit next to. Still further, it is an object of this invention to provide a vertically adjustable seat which has at least three readily selectable vertical positions of adjustment, and with the three positions being easily located, and with the seat being rotatable to face a forward or a rearward position while still having the vertical adjustment readily accomplished for either facing position mentioned.

BRIEF DESCRIPTION OF THE DRAWINGS

FIG. 1 is a side elevational view of a tractor having an adjustable seat mounted thereon.

FIG. 2 is a top plan view of a fragment of FIG. 1 and showing the two tractor controls and the location of the seat.

FIG. 3 is an enlarged front elevational view of the seat of the tractor, with parts removed and parts broken away.

FIG. 4 is a side elevational view of a fragment of the seat post shown in FIG. 3.

DETAILED DESCRIPTION OF THE PREFERRED EMBODIMENT

FIG. 1 shows a conventional tractor 10 having a conventional front loader 11 and a conventional backhoe 12, both mounted on the tractor for the usual operation of picking up dirt or like material. A tractor seat, generally designated 13, is mounted on the tractor 10, and it is intermediate the tractor forwardly located control 14, and a rearwardly located control 16, which is in the form of levers for operating the backhoe 12. To complete the description of the conventional tractor and implements 11 and 12, the tractor is shown to have a front wheel 17 and a rear wheel 18, with both wheels supported on a ground line designated G and shown in a broken line. It will therefore be understood that the operator occupies the seat 13, and, in the position shown in FIG. 1, the seat is facing toward the forwardly located control 14, and the operator would then either be driving and steering the tractor through the steering wheel 14, or he could be operating the front loader 11, such as through the other controls like a control 19. Of course the seat 13 can be turned rearwardly on the tractor to face a backhoe control 16, and it is understood that the seat 13 is supported on the tractor floor or platform designated 21. Still further, the seat 13 is shown in FIG. 1 to have a slanted track which includes the lower portion 22 and the upper slidable portion 23, and such slanted track seat is of a conventional construction, such as that shown in the cited U.S. Pat. No. 3,437,373. Therefore, the seat 13 can be moved forwardly and rearwardly, and it can be moved up and down, with both movements being along the slanted seat lower portion 22, and such movement assists in the adjustment of the seat.

FIG. 2 shows that the tractor steering wheel 14 is located along a center or axial line designated 24, while the backhoe controls 16 are shown located along a center or axial line designated 26. The lines 24 and 26 are offset laterally of the tractor, as shown in FIG. 2, and this is a customary arrangement of a tractor. Therefore, it is a problem with the adjustable tractor seat to have the seat properly located with respect to the selected one of the controls 14 and 16. FIGS. 1 and 2 show that the seat lower portion 22 includes a plate 27 which is disposed intermediate the controls 14 and 16 and the seat 13 includes a pedestal 28 which is shown offset relative to the seat plate 27. The pedestal 28 is therefore shown on a center or axial line 29, and FIG. 2 shows the line 29 is in between the lines 24 and 26 which locate the controls 14 and 16, respectively. Therefore, FIG. 2 shows the seat plate 27 in the forwardly facing position of the seat, and, as such, the seat 13 is aligned with the forwardly located control 14. It will also be understood that when the seat plate 27 is rotated one-half turn about the upright axis of the pedestal 28, then the seat plate 27, and therefore the entire upper structure of the seat itself will move into alignment with the backhoe controls 16. The rotatable seat 13 therefore centers itself with the selected one of the controls 14 and 16, so the operator sits adjacent the selected one of the controls 14 and 16.

FIGS. 3 and 4 show the arrangement of the seat pedestal 28, and it will here be noted that the structure includes a sleeve 31 which is suitably secured to the tractor floor 21. A seat post 32 is telescoped within the sleeve 31, and the upper end of the post 32 is suitably secured to the seat plate 27. At this point it will also be noted that FIG. 3 shows the seat slanted track guides 30, and such guides are shown to be laterally offset relative to the sleeve 31 and the telescoped seat post 32, as mentioned with respect to FIG. 2.

Post 32 is shown to be tubular, and it has a compression coil spring 33 disposed inside and for the length of the post 32. Also, another post 34 is telescoped within the post 32, and the post 34 is shown to terminate at the end designated 36', and this post 34 serves as a guide in the pedestal 28. Sleeve 31 is shown to consist of a lower portion 36 and a upper portion 37 secured together by a weldment at 38. The outer diameters of the sleeve portions 36 and 37 are shown to be the same, but the inner diameter of the upper sleeve portion 37 is shown to be less than the inner diameter of the lower sleeve portion 36. Also, a snapring 39 is secured to the lower end of the post 32, and the snapring is of a size larger than the internal diameter of the sleeve upper portion 37, so the post 32 cannot be withdrawn from the sleeve 31, once the assembly is made. However, the post 32 can move up and down in the sleeve 31 to the extent of the length of the sleeve lower portion 36.

A latching structure designated 41 is mounted on the sleeve 31 and includes a pin 42 which moves through an opening 43 in the sleeve 31. Also, the post 32 has holes 44 spaced along the length of the post 32 and adjacent the pin 42 in the FIG. 3 position. FIG. 4 shows that there are three such holes 44, and these holes may be designated as one group of holes. Further, the lower end of the post 32 has another group of holes, and these holes are shown in FIGS. 3 and 4 and are designated 46. Thus the two groups of holes 44 and 46 are on diametrically opposite sides of the post 32, and all of the holes 44 and 46 snugly receive the pin 42 when the holes are individually aligned with the pin 42 in a self-locating manner hereinafter described.

The latching mechanism 41 therefore movably supports the latching pin 42 by having the pin 42 mounted on an arm 47 pivoted on a pin 48 supported on the latching mechanism housing 49. A control arm 51 is connected to the pivot arm 47 for retracting the pin 42 from the post holes 44 and 46 upon depressing the control arm 51. A compression spring 52 is disposed between the housing wall 53 and the arm 47 to yieldingly urge the pin 42 toward the post 32 and into one of the holes 44 or 46. Such latching mechanism may be as shown in the cited U.S. Pat. No. 3,437,373.

FIGS. 3 and 4 also show that the post 32 has a series of grooves 54 intersecting the holes 44, and it has a series of grooves 56 intersecting the holes 46. The grooves 54 and 56 are shown to extend completely around the outer circumference of the post 32, and they are shown to be only slightly larger than or substantially the same size as the diameter of the holes 44 and 46. Thus, it will be seen that in the FIG. 3 position of the post 32, the seat 13 is in the intermediate lower position in that the pin 42 is in the center one of the series of upper holes 44. However, upon retracting the pin 42 from the center hole 44, the post 32 could be either raised or lowered from the position shown, and the pin 42 can then enter either the upper hole 44 or the lower hole 44, which ever is desired. For lowering the post 32, the seat plate 27 could come down toward the inner post upper end 36', and the seat post 32 could move downwardly into a position of clearance above the floor 21 or to a position through an opening 57 shown in the floor 21 to accommodate the lowered position of the post 32. Also, in this arrangement, the inner post 34 and spring 33 are suitably anchored to the platform 21, or to the sleeve 31, and such anchoring may be through a pin 58, in any conventional arrangement.

It will now be seen and understood that the seat 13 has self-locating means for adjusting both the elevation and the facing positions of the seat. That is, once the seat post 32 is positioned to have the upper grooves 54 completely above the location of the pin 42, upon lowering the post 32, the pin 42 will enter the lower groove 54, and such connection is self-locating. Then, upon rotating the seat and its post 32, the pin 42 will also locate itself in the lower one of the three holes 44. Further, the operator can do the same by approaching the upper groove 54 when the post 32 has been lowered below the position of alignment of the upper groove 54 with the pin 42. Still further, the insertion of the pin 42 in the center one of the holes 44 is self-locating and readily accomplished from a position of either the upper groove 54 or the lower groove 54.

Likewise, the seat has the self-locating features of elevation and facing with respect to the group of lower holes 46 and lower grooves 56. Of course in either instance, the holes 44 are located to one side of the post 32 so that the seat is properly offset for positioning the operator adjacent the forwardly located controls 14. Conversely, the lower holes 46 are located to the other side of the post 32 for positioning the seat offset but adjacent the rearwardly located controls 16. It will of course be understood and appreciated that the pin 42 should be snug with the holes 44 and 46. However, without the self-locating grooves 54 and 56, it is difficult for the operator to find the desired one of the holes 44 and 46, especially where the fit is snug, as mentioned. With the arrangement described, the operator can simply get off the seat 13 and the spring 33 will assist in raising the seat when the pin 42 is withdrawn from one of the holes 44 and 46. The operator then need only rotate the seating support or portion 27, after the appropriately selected groove 54 or 56 has received the pin 42, and the seat is then in its adjusted position. Therefore, with regard to the feature of the seat with its offset relationship with the lower supporting pedestal shown, while it is old to have offset seats for tractors, such as shown in U.S. Pat. No. 2,845,990, the presently described arrangement of the offset seat and the self-locating positions for the seat, both relative to each other, is not old, and, in addition to the arrangement of the self-locating means described, the relationship of the offset seat and the self-locating means is novel with this disclosure.

What is claimed is:

1. In a vertically and facingly adjustable tractor seat, a tractor having a fore-and-aft axis, a seat sleeve being mounted on said tractor for supporting the operator, two separate controls for operating said tractor and with said controls being oppositely located relative to both said seat and to the fore-and-aft axis to have one of said controls toward the front of said tractor and the other of said controls toward the rear of said tractor, a post telescoped within said sleeve and being both movable and rotatable relative to said sleeve and to the telescoping axis, a seating support on the upper end of said post for receiving and supporting a person and being axially movable and axially rotatable along with said post, said post having holes extending transverse to said axis and spaced along the axial length of said post and being in two groups on diametrically opposite sides of said post and with each of said groups including a series of said holes disposed in a vertical row and with said groups being offset from each other along said axial length, releasable latch means on said sleeve and including a pin having an end receivable within said holes for temporarily vertically and rotationally locking said post with said sleeve in a selected position of alignment of any one of said holes with said pin, the improvement comprising said post having separate grooves in the outer surface thereof and with each of said grooves extending horizontally and endlessly around said post and respectively intersecting each of said holes and with each of said grooves being of a width greater than the size of said end of said pin to have each one of said grooves receive said end of said pin and thereby vertically located said post and guide said post to a rotated position of alignment of said pin with said hole which intersects the selected one of said grooves.

2. The subject matter of claim 1, wherein said seating support includes two portions disposed with one above the other, a slanted track between said portions and being connected thereto for slidably guiding the upper one of said portions on the lower one of said portions for raising and lowering said seat and for positioning said seat along the fore-and-aft axis.

3. The subject matter of claim 1, wherein said controls are disposed equally offset from and on opposite sides of a vertical plane extending parallel to said fore-and-aft axis, said sleeve and said post having their longitudinal axes extending along said plane, said seating support being offset relative to said longitudinal axis of said post for positioning said seating support toward the respective one of said controls in accordance with the rotation of said post and said seating support on said sleeve.

4. The subject matter of claim 3, wherein said two groups of said holes present an upper group and a lower group disposed in the vertical extent of said post, and the offset of said seating support relative to said post being related to said two groups of said holes in an arrangement with said upper group of said holes being on one diametrical side of said post relative to the offset of said seating support, for positioning said seating support closer to one of said controls, when said upper group of said holes is aligned with said pin, and with said arrangement where said lower group of said holes are on the other diametrical side of said post, relative to the offset of said seating support for positioning said seating support closer to the other of said controls, when said lower group of said holes is aligned with said pin.

5. The subject matter of claim 1, wherein said sleeve includes two portions axially aligned in end-to-end relation and welded together and with the upper one of said portions having an internal diameter less than that of the lower one of said two portions, and an abutment on the lower end of said post and being of a size movable along the axis of said lower portion of said sleeve and with the size being greater than said internal diameter to abut the lower edge of said upper portion when said post is moved vertically relative to said sleeve, said upper portion having an opening therein for receiving said pin, and the lowermost one of said grooves on said post being disposed above said abutment a distance at least as great as the distance said pin is located from said lower edge of said sleeve upper portion so that said post can move upwardly to a position of alignment of said lowermost groove with said pin.

* * * * *